(12) United States Patent
Jones et al.

(10) Patent No.: US 8,117,291 B1
(45) Date of Patent: Feb. 14, 2012

(54) USE OF INTERNET WEB TECHNOLOGY TO REGISTER WIRELESS ACCESS CUSTOMERS

(75) Inventors: William John Jones, Chippenham (GB); Michael Bowring, Stroud (GB)

(73) Assignee: Wireless Technology Solutions LLC, New York, NY (US)

( * ) Notice: Subject to any disclaimer, the term of this patent is extended or adjusted under 35 U.S.C. 154(b) by 650 days.

(21) Appl. No.: 09/626,699

(22) Filed: Jul. 27, 2000

Related U.S. Application Data

(63) Continuation-in-part of application No. 09/432,824, filed on Nov. 2, 1999, now Pat. No. 6,865,169.

(51) Int. Cl.
- G06F 15/177 (2006.01)
- G06F 15/16 (2006.01)
- H04M 3/00 (2006.01)
- H04W 4/00 (2009.01)

(52) U.S. Cl. ........ 709/222; 709/228; 455/418; 455/419; 455/435.1

(58) Field of Classification Search .................. 709/217, 709/219, 222, 225, 227, 228; 370/335; 455/433, 455/435.1, 418, 419
See application file for complete search history.

(56) References Cited

U.S. PATENT DOCUMENTS

| | | | |
|---|---|---|---|
| 4,593,155 A * | 6/1986 | Hawkins | ........................ 455/411 |
| 5,442,625 A | 8/1995 | Gitlin et al. | |
| 5,638,371 A | 6/1997 | Raychaudhuri et al. | |
| 5,684,791 A | 11/1997 | Raychaudhuri et al. | |
| 5,745,480 A | 4/1998 | Behtash et al. | |
| 5,889,958 A | 3/1999 | Willens | |
| 5,933,421 A | 8/1999 | Alamouti et al. | |
| 5,940,771 A | 8/1999 | Gollnick et al. | |
| 5,956,636 A * | 9/1999 | Lipsit | ........................... 455/411 |
| 5,999,812 A * | 12/1999 | Himsworth | ................ 455/435.2 |
| 6,047,177 A | 4/2000 | Wickman | |
| 6,061,650 A | 5/2000 | Malkin et al. | |
| 6,064,879 A * | 5/2000 | Fujiwara et al. | .............. 455/419 |
| 6,119,160 A | 9/2000 | Zhang et al. | |
| 6,144,849 A | 11/2000 | Nodoushani et al. | |
| 6,151,628 A * | 11/2000 | Xu et al. | ........................ 709/225 |
| 6,157,829 A * | 12/2000 | Grube et al. | ............... 455/414.1 |
| 6,188,899 B1 * | 2/2001 | Chatterjee et al. | ......... 455/435.1 |
| 6,192,242 B1 * | 2/2001 | Rollender | ...................... 455/433 |
| 6,198,920 B1 | 3/2001 | Doviak et al. | |
| 6,212,390 B1 | 4/2001 | Rune | |

(Continued)

FOREIGN PATENT DOCUMENTS

EP 0467534 1/1992

(Continued)

OTHER PUBLICATIONS

3rd Generation Partnership Project 2 "3GPP2". (Jul. 1999). "Physical Layer Standard for cdma2000 Spread Spectrum Systems," 3GPP2 C.S0002-0 Version 1.0, 369 pages.

(Continued)

*Primary Examiner* — Gregory Todd
(74) *Attorney, Agent, or Firm* — Fitch Even Tabin & Flannery

(57) ABSTRACT

Internet web technology is used to register wireless access customers without the need of a programmable smart card or SIM (subscriber identity module) or a fixed line wired connection by providing an anonymous session connection between a special registration web server and the user equipment.

23 Claims, 3 Drawing Sheets

U.S. PATENT DOCUMENTS

| | | | |
|---|---|---|---|
| 6,243,372 B1 | 6/2001 | Petch et al. | |
| 6,272,129 B1 | 8/2001 | Dynarski et al. | |
| 6,295,291 B1* | 9/2001 | Larkins | 370/352 |
| 6,308,069 B1* | 10/2001 | Freitag et al. | 455/435.1 |
| 6,324,402 B1 | 11/2001 | Waugh et al. | |
| 6,334,057 B1 | 12/2001 | Malmgren et al. | |
| 6,351,458 B2 | 2/2002 | Miya et al. | |
| 6,370,384 B1 | 4/2002 | Komara | |
| 6,373,831 B1 | 4/2002 | Secord et al. | |
| 6,374,112 B1 | 4/2002 | Widegren et al. | |
| 6,377,955 B1 | 4/2002 | Hartmann et al. | |
| 6,381,454 B1* | 4/2002 | Tiedemann, Jr. et al. | 455/419 |
| 6,393,408 B1* | 5/2002 | Mosher et al. | 705/28 |
| 6,400,966 B1 | 6/2002 | Andersson et al. | |
| 6,404,755 B1 | 6/2002 | Schafer | |
| 6,421,714 B1 | 7/2002 | Rai et al. | |
| 6,453,414 B1 | 9/2002 | Ryu | |
| 6,466,556 B1 | 10/2002 | Boudreaux | |
| 6,490,445 B1* | 12/2002 | Holmes | 455/419 |
| 6,490,667 B1 | 12/2002 | Ikeda | |
| 6,515,989 B1* | 2/2003 | Ronneke | 370/389 |
| 6,519,461 B1 | 2/2003 | Andersson et al. | |
| 6,571,290 B2 | 5/2003 | Selgas et al. | |
| 6,574,211 B2 | 6/2003 | Padovani et al. | |
| 6,577,862 B1 | 6/2003 | Davidson et al. | |
| 6,577,874 B1* | 6/2003 | Dailey | 455/521 |
| 6,587,684 B1 | 7/2003 | Hsu et al. | |
| 6,618,592 B1* | 9/2003 | Vilander et al. | 455/452.1 |
| 6,628,671 B1 | 9/2003 | Dynarski et al. | |
| 6,628,934 B2 | 9/2003 | Rosenberg et al. | |
| 6,628,942 B1 | 9/2003 | Beming et al. | |
| 6,636,894 B1* | 10/2003 | Short et al. | 709/225 |
| 6,675,208 B1* | 1/2004 | Rai et al. | 709/224 |
| 6,681,099 B1 | 1/2004 | Keranen et al. | |
| 6,687,252 B1* | 2/2004 | Bertrand et al. | 370/401 |
| 6,714,931 B1 | 3/2004 | Papierniak et al. | |
| 6,718,332 B1 | 4/2004 | Sitaraman et al. | |
| 6,728,884 B1* | 4/2004 | Lim | 726/12 |
| 6,760,303 B1 | 7/2004 | Brouwer et al. | |
| 6,760,416 B1 | 7/2004 | Banks et al. | |
| 6,785,823 B1 | 8/2004 | Abrol et al. | |
| 6,804,720 B1* | 10/2004 | Vilander et al. | 709/229 |
| 6,826,166 B2 | 11/2004 | Yokoyama | |
| 6,839,339 B1* | 1/2005 | Chuah | 370/349 |
| 6,865,169 B1 | 3/2005 | Quayle et al. | |
| 6,873,609 B1 | 3/2005 | Jones et al. | |
| 6,879,832 B1* | 4/2005 | Palm et al. | 455/445 |
| 6,894,994 B1 | 5/2005 | Grob et al. | |
| 7,065,340 B1 | 6/2006 | Einola et al. | |
| 7,076,240 B2* | 7/2006 | Holmes | 455/419 |
| 7,079,499 B1 | 7/2006 | Akhtar et al. | |
| 7,149,229 B1 | 12/2006 | Leung | |
| 2001/0001268 A1 | 5/2001 | Menon et al. | |
| 2002/0010683 A1 | 1/2002 | Aune | |

FOREIGN PATENT DOCUMENTS

| | | | |
|---|---|---|---|
| EP | 0817518 | 1/1998 | |
| EP | 0918417 | 10/1998 | |
| EP | 0917328 | 5/1999 | |
| EP | 0986222 | 8/1999 | |
| GB | 2348778 | 4/1999 | |
| JP | 10243120 | 9/1998 | |
| JP | 11098254 | 4/1999 | |
| WO | WO-9901969 | 1/1999 | |
| WO | WO-0000904 | 1/2000 | |
| WO | WO 00/08803 | 2/2000 | |
| WO | WO-00/25475 A1 | 5/2000 | |
| WO | WO 00/38391 | 6/2000 | |
| WO | WO-0044148 | 7/2000 | |
| WO | WO-0046963 | 8/2000 | |
| WO | WO-0128168 | 4/2001 | |
| WO | WO-0131843 | 5/2001 | |
| WO | WO-0141470 | 6/2001 | |
| WO | WO-0167706 | 9/2001 | |
| WO | WO-0167716 | 9/2001 | |
| WO | WO-0169858 | 9/2001 | |
| WO | WO-0197060 | 12/2001 | |
| WO | WO-0211467 | 2/2002 | |
| WO | WO 02/41597 A2 * | 5/2002 | 370/335 |

OTHER PUBLICATIONS

Bender, P. et al. (Jul. 2000). "CDMA/HDR: A Bandwidth-Efficient High-Speed Wireless Data Service for Nomadic Users," *IEEE Communications Magazine*, pp. 70-77.

Ekstein, R. et al. (April). "AAA Protocols: Comparison Between RADIUS, DIAMETER and COPS," AAA Working Group, Internet-Draft, located at <http://tools.ieff.org/html/draft-ekstein-aaa-protcomp-00> visited on Sep. 12, 2007. (29 pages).

Great Britain Examination Report mailed May 13, 2003, for GB 0118393.8, 3 pages.

Great Britain Examination Report mailed May 7, 2003, for GB 0118392.0, 3 pages.

Great Britain Search Report mailed Mar. 18, 2002, for GB 0118391.2, 3 pages.

Great Britain Search Report mailed Mar. 18, 2002, for GB 0118392.0, 3 pages.

Great Britain Search Report mailed Mar. 18, 2002, for GB 0118393.8, 3 pages.

Great Britain Search Report mailed May 14, 2002, for GB 0127567.6, 2 pages.

Qualcomm. (Oct. 2006). "Commonalities Between CDMA2000 and WCDMA Technologies," Qualcomm Incorporated, pp. 1-46.

TSG RAN. (Jul. 6-7, 1999) "Liaison from ITU-R TG 8/1 on the Approval of Recommendation IMT.RSPC and on the Provision of Relevant Information from External Organizations," 3GPP/PCG Meeting #2, 3GPP/PCG#2(99)5, 58 pages.

U.S. Appl. No. 09/626,582, filed Jul. 27, 2000 for Williams et al.

U.S. Appl. No. 09/626,700, filed Jul. 27, 2000 for Jones et al.

U.S. Appl. No. 11/510,861, filed Aug. 25, 2006 for Quayle et al.

Dahlman, Erik et al. (Nov. 1998) "WCDMA—The Radio Interface for Future Mobile Multimedia Communications," IEEE Transactions on Vehicular Technology, 47(4): 1105-1118.

GB Search Report mailed Mar. 18, 2003 for GB Application No. GB 0118393.8 filed Jul. 27, 2001, 3 pages.

Search Report mailed Mar. 18, 2002, for GB Application No. GB 0118392.0 filed Jul. 27, 2001, three pages.

Examination Report mailed May 7, 2003, for GB Application No. GB 0118392.0 filed Jul. 27, 2001, three pages.

Japanese Office Action (with translation) dated May 19, 2011 from Japanese Patent Application No. 2002-515857.

Japanese Patent Laid-Open No. 11-98254 published Apr. 9, 1999 with translation of abstract.

Rigney, C., Radius Accounting, RFC 2059, Jan. 1997, pp. 1-22, http://www.ieff.org/rfc/rfc2059.txt?number=2059.

Rigney et al., Radius, RFC 2138, Apr. 1997, pp. 1-22, http://www.ietf.org/rfc/rfc2138.txt?number=2138.

RFC:2604, Wireless Device Configuration (OTASP?OTAPA) via ACAP, Jun. 1999.

Rigney, C., Radius Accounting, RFC 2139, Jun. 2000, pp. 1-25, http://www.ietf.org/rfc/rfc2866.txt?number=2866.

Translation of Japanese Final Rejection Dated Feb. 15, 2011 from Japanese Patent Application No. 2002-515859.

Japanese Office Action (with partial translation) dated May 19, 2011 from Japanese Patent Application No. 2002-515857.

* cited by examiner

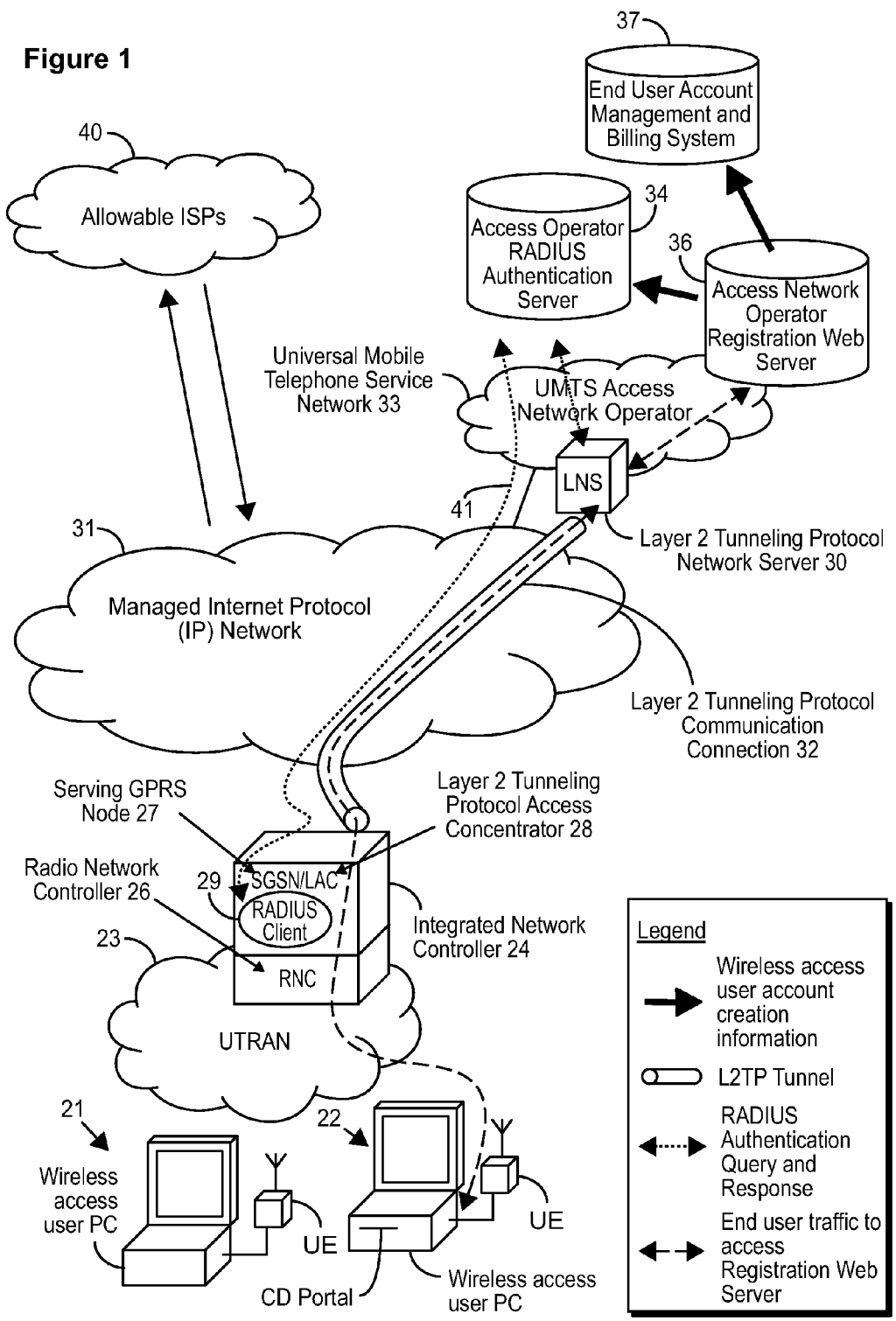

USE OF INTERNET WEB TECHNOLOGY TO REGISTER WIRELESS ACCESS CUSTOMERS

RELATED APPLICATION

This is a continuation-in-part of application Ser. No. 09/432,824, filed Nov. 2, 1999 now U.S. Pat. No. 6,865,169, entitled "CELLULAR WIRELESS INTERNET ACCESS SYSTEM USING SPREAD SPECTRUM AND INTERNET PROTOCOL (IP)."

INTRODUCTION

The present invention is directed to the use of Internet web technology to register wireless access customers.

BACKGROUND OF THE INVENTION

The above application describes a cellular wireless Internet access system which operates in the 2 gigahertz band range to provide high data rates to fixed and portable wireless users. Such users connect to near-by base stations which in turn communicate to Integrated Network Controllers which are then connected to the Internet. Such wireless implementation relates to an access network of the UMTS (Universal Mobile Telephone Service) and its subset UTRAN (Universal Terrestrial Radio Access Network) standards.

In order to gain service in a cellular wireless network of the types similar to the above, a sales representative at a retail location typically takes customer information credit history, etc. That information is used to create an account with a cellular service provider, with the customer information stored on the service provider's Home Location Register (HLR) or other customer database. A SIM (Subscriber Identity Mode) card is then associated with the account and placed within the cellular terminal (typically, a mobile phone or wireless Internet device).

However, both of the above techniques are cumbersome, requiring action on the part of the retailer or network service provider, and creating a time delay before a new customer can use the service. It is therefore desired to allow the user to self-register without such prior registration formalities to gain access to Internet services over the wireless system as above.

SUMMARY OF INVENTION

In accordance with a first aspect of the invention, there is provided a method of registering a user in a wireless Internet access system.

In accordance with a second aspect of the invention there is provided a wireless user equipment arrangement for use with a wireless access network system.

In accordance with a third aspect of the invention there is provided a wireless access network system.

In accordance with a fourth aspect of the invention there is provided a computer program element comprising computer program means for performing user registration functions in a wireless access network system.

In a preferred form of the invention, each user has a personal computer (PC) and each user utilizes wireless User Equipment (UE) typically with a directly attached antenna for communicating in a wireless manner with a cellular network controller. A user acquires the User Equipment along with magnetic or optical storage means (CD) having predetermined software for use in registration. A wizard in the predetermined software controls the PC and its connected wireless User Equipment.

Under the direction of the wizard in the PC, the subscriber terminal is commanded to communicate in a wireless manner with the wireless network. Because the customer has not previously registered with the wireless access network operator, it is only permitted on the network as an anonymous subscriber and is permitted to communicate only with the network operator's registration web server. This is achieved by use of a special 'new user' ID and password pre-programmed on the CD. A communication session is established between the PC, User Equipment and the network operator's registration web server (via wireless access), and credit card, other personal details and type of service required are entered. The registration web server contains a list of allowable ISPs that can be accessed on the system. This list is used for subsequent accesses after registration has completed. The user enters a preferred User ID and if authorized by the registration server, the customer is allocated a User ID and Password; the same information is transferred to PC and the access network operator's Home Location Register (which contains the database of authorized customers). Thereafter, the subscriber is authorized to use the network and can establish normal connections on the wireless network and to allowable ISPs (Internet Service Providers) for an Internet session and access to any part of the Internet permitted by that ISP.

BRIEF DESCRIPTION OF THE DRAWINGS

FIG. 1 is a block diagram of an Internet system illustrating the present invention.

DETAILED DESCRIPTION OF PREFERRED EMBODIMENT

Figure 2A:
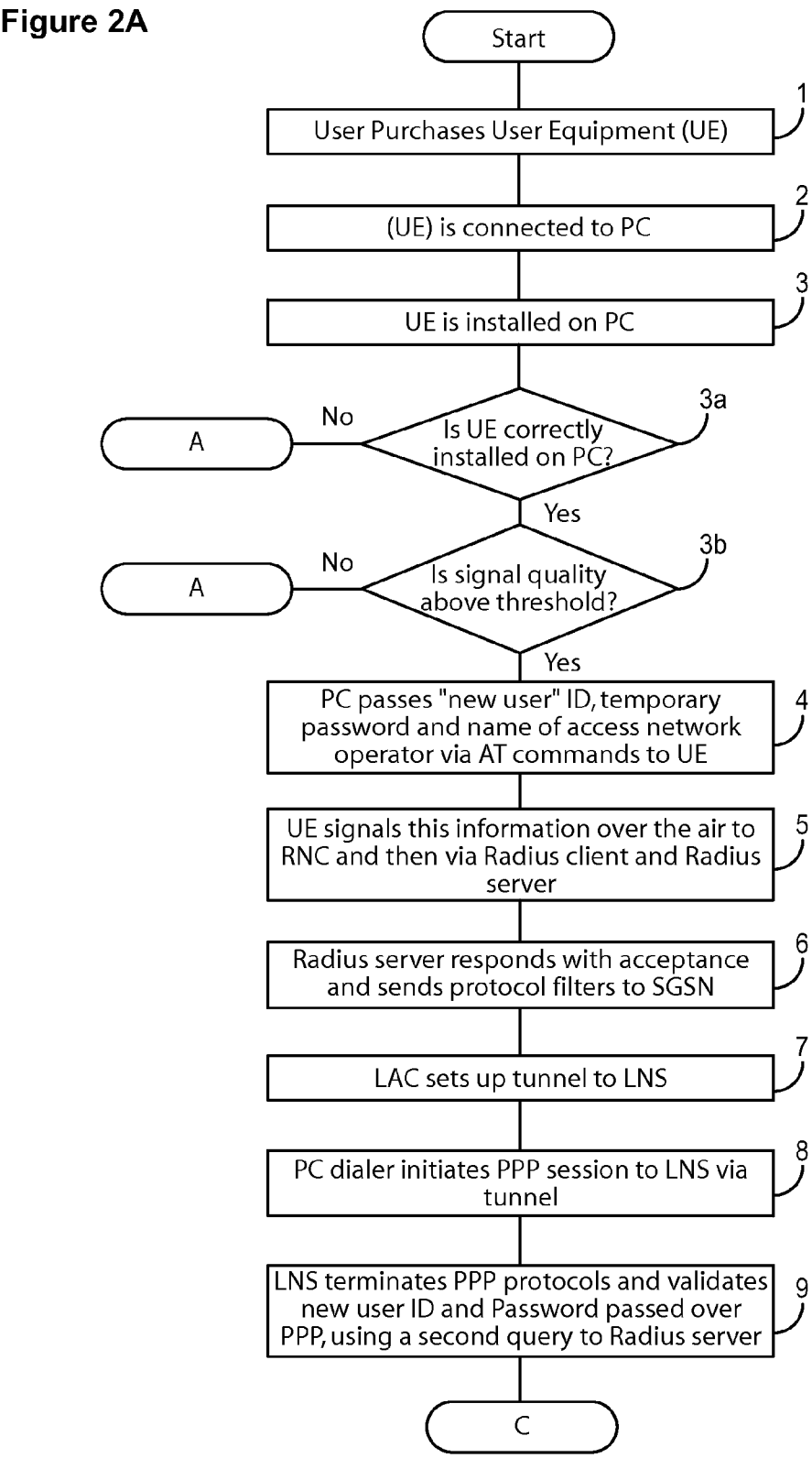
FIGS. 2A and 2B form a flow chart showing the operation of the invention.

Referring now to FIG. 1, two users of the Internet access system are illustrated at 21 and 22, with User Equipments, known as User Equipment (UE), 21' and 22' connected by a typical data connection to the computer using RS232, USB or Ethernet. The personal computer has a CD drive or similar media input device in which a special compact disk, or similar media, containing software including a wizard (that is, the instructional system procedures for registration) is placed. Both the UE and CD are acquired and purchased at some retail location or by mail. In any case, both the CD and the UE are at the location of the user.

The wireless access UE 21 and 22, as described in the above application, are a part of a UMTS/UTRAN system which by many wireless techniques (a specific novel one is described in the above application) communicates in a wireless manner via a UTRAN network as indicated by the symbol 23 to an Integrated Network Controller (INC) 24. Such controller may be connected by wireline or otherwise to an Internet Protocol (IP) Network 31. As discussed in the above pending application, the Integrated Network Controller 24 includes an RNC or Radio Network Controller 26 which controls and allocates the radio network resources and provides reliable delivery of user traffic between a base station (described in the above pending application) and User Equipment (UE) and eventually the Integrated Network Controller (INC) 24. An SGSN (Serving General Packet Radio Service Support Node) 27 provides session control and connection to the Access Operator Radius Authentication Server 34 and, lastly, LAC 28 (layer 2 Tunneling Protocol Access Concentrator) provides the gateway functionality to the Internet Service Providers (ISP) 40 and to the registration server. A Layer 2 Tunneling Protocol Network Server (LNS) 30 terminates communication tunnels from the LAC through the IP network. The Access Operator Radius Authentication Server 34 supports the Home Location Register (HLR) functionality (described in the above pending application). The Access Operator Registration Server 36 provides the facilities for a new user to register.

The Integrated Network Controller 24 also illustrates that it includes a "RADIUS" client 29. RADIUS is a system including the software that supports centralized access control for Internet access which, as discussed above, is traditionally used where the access to the Internet is via the public switched telephone network. A description of RADIUS is provided by an article RFC 2138 Remote Authentication Dial-in User Service (RADIUS) by C. Rigney, et al., April 1997, which is available at the website WWW.IETF.ORG.

In all cases of communication of a user equipment 21 or 22 through the Internet Protocol Network, illustrated as 31, authentication is performed by the User Equipment (UE) signaling the customer's wireless access authentication information which is passed over the air to Integrated Network Controller 24 which queries a RADIUS server authentication service with the user ID (identification) and temporary password. The RADIUS server used is the Access Operator's RADIUS Authentication Server 34 which communicates with the Integrated Network Controller via the IP network using UDP/IP protocols with additional protocol layers for security.

In the case of a new user, a 'new user' ID and temporary password, preprogrammed in the CD software is signalled to the Access Operator's RADIUS Authentication Server 34 via the INC 24. The Access Operator's RADIUS Authentication Server 34 recognizes the user as a 'new user' and communicates a set of protocol filters to the INC 24 that results in a PPP (Point-to-Point Protocol) session being set up between the User's PC and the Access Operator's Registration Server 36 via the Layer 2 Tunneling Protocol link 32 and bars the user from accessing any other service. The Access Operator's Registration Server 36 is connected to the subscriber account management and billing system 37.

Thus, the foregoing constitutes the anonymous session link where a general or non-authenticated user can still gain access to the wireless access operator's registration server for the purpose of new-user registration. The accompanying legend indicates the various paths. A UMTS access licensed operator 33 provides the special servers 34 and 36 along with the billing system 37.

Figure 2B:
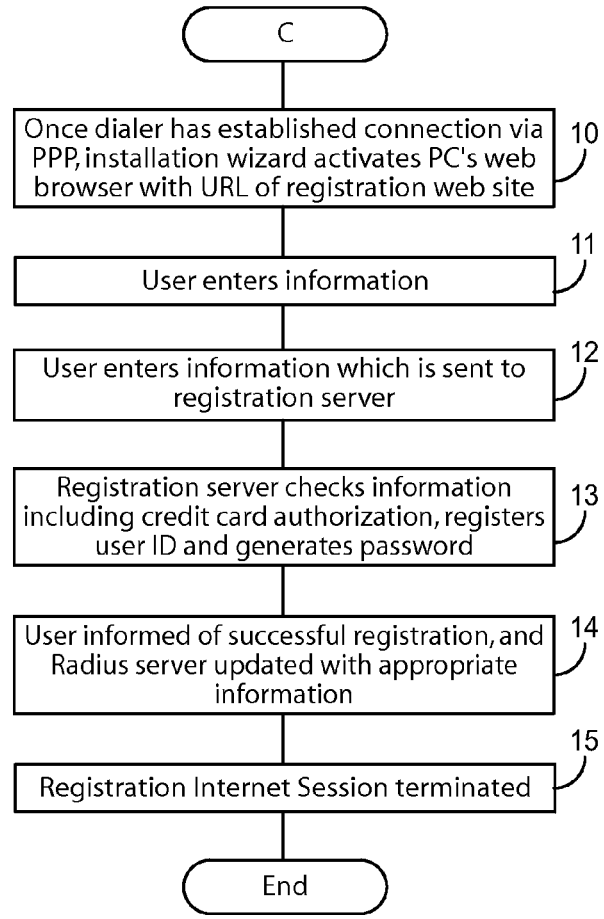

The flow charts of FIG. 2 aptly describes the operation shown in the block diagram system of FIG. 1. After Start, in Step 1, the user purchases the equipment, which has been defined as the User Equipment (UE) and a CD with the appropriate software and wizard procedure installed on it. A manual is also provided. The CD also contains, besides the installation software, the required software drivers. The user residence when the user purchases the foregoing may be checked for coverage via use of user's zip code or other geographic information. This information can all be provided by Internet Web access.

In Step 2, the User Equipment is connected to the PC. This connection can be USB, Ethernet, RS 232, etc., as illustrated in FIG. 1.

In Step 3, the User Equipment is installed on the PC. This is done through the wizard software and will support all the connection interfaces specified; that is, the RS 232, USB or Ethernet. Steps 3a and 3b are precautionary checks. In Step 3a, the UE installation software checks that the modem is connected correctly and operational. If no return is made because of a failed process installation, designated by the step A, a cell search is performed in the next Step 3b. Here, the User Equipment received signal quality is measured and reported to the user via the installation wizard. Again, if the quality of the signal fails, a return is made to Start. In effect, registration will not be possible.

In Step 4, the user equipment, under the standard "attention" (AT) modem sends new user ID and temporary password to the UE. Then in step 5 the UE sends this authentication information over the air to the RNC 26 which is passed on the Radius Client 29 and the SGSN 27, which queries the RADIUS server 34 with the "new user" ID and temporary 'new user' password.

In Step 6, the RADIUS server 34 responds with acceptance plus a set of protocol filters to be applied in the SGSN 27 to the traffic for this specific registration session. The protocol filters serve to bar this user from accessing other Internet services or sites other than the predetermined registration server 36. The RADIUS server also details the ISP, in this case an ISP at the network access operator, to connect to the UMTS access operator 33 and to the registration web server 36.

Next, in Step 7, the Layer 2 Tunneling Protocol Access Concentrator 28 in the Radio Network Controller 24 sets up, as shown by the dashed line 32 in FIG. 1, a communications tunnel to LNS 30 and waits for a PPP (point-to-point protocol) connection request to come in. In Step 8, the PC "dialer" software then proceeds to initiate a PPP session which is passed to the LNS via Layer 2 Tueling Protocol for authentication. In step 9, the LNS then terminates the various protocols used within PPP for setting up the connection and validates a dial-up "new user" user ID and password passed over the PPP. This involves a second query to the RADIUS server 34 represented by path 41.

In step 10, once the dialer is connected to the personal computer, PC, via the PPP, the installation wizard activates the PC's web browser, which will then download a web page for registration from the Registration Web Server 36. Then, in step 11, the user is prompted to enter preferred user ID, password, credit card details, personal details, type of service required. A list of allowable ISPs supported by the Access Operator is provided as well as their specific registration software if required. Information on the types of service available is provided via the registration web page. In step 12, when the user has entered the appropriate data and "clicked to send" the information is sent to the registration server. In step 13 the registration server checks the information entered (including credit card authorization if required) and generates a permanent password. If the requested User ID has already been allocated the user will be provided with an option or requested to enter a new User ID. In step 14 the user is informed of successful registration via a web page downloaded from the Registration Web Server 36 that contains the user's name and permanent password, and the RADIUS server 34 is updated with the appropriate user information and the selected user name and password for wireless access. This is all saved on the PC for future use. Finally, in step 15, the registration Internet session is then terminated.

The user is now registered with the Access Operator, assuming credit checks have been successful, and normal internet wireless access can be requested with a new session.

In the case of the present invention, the new customer's User Equipment (UE) sends identifying information which is a 'new user' ID and 'new user' password when requesting connection to the wireless access network. This is gained in a special anonymous connection. And, as discussed above, through protocol filters, the connection can be suitably restricted.

Thus, customers may purchase their user equipment from a retail outlet. They will then connect their equipment to their personal computer and be able to use it to gain Internet access for the purpose of registering themselves and creating their account on-line. This user initiated registration is made possible by the use of the above-described web-based Internet registration process.

What is claimed is:

1. A method for a registration server of a wireless network comprising a Universal Mobile Telecommunications System (UMTS) access network, the method comprising:
    establishing an anonymous communication session between a user equipment UE and the registration server via the UMTS access network, in response to authentication by an authentication server of a temporary ID and a temporary password identifying the UE as unregistered, wherein the anonymous communication session uses a tunneling communications protocol;
    transmitting to the UE, via the anonymous communication session with the UE, a reply message comprising a request for registration information;
    receiving, from the UE, in response to the request for registration information, a permanent ID and a permanent password; and
    completing registration for the user equipment (UE) for subsequent access to the Internet through the Universal Mobile Telecommunications System (UMTS) access network using the permanent ID and permanent password.

2. The method of claim 1 wherein
    the requested registration information further comprises indicia of a preferred service provider, and
    receiving, from the UE, in response to the request for registration information, includes receiving the indicia of a preferred service provider from the user equipment.

3. The method of claim 1 wherein
    the requested registration information further comprises indicia of a requested type of service, and
    receiving includes receiving the indicia of a requested type of service from the user equipment.

4. The method of claim 1 wherein
    the requested registration information further comprises a preferred user name.

5. The method of claim 1, wherein
    the reply message further comprises at least one protocol filter to restrict an access to the wireless network by the user equipment.

6. The method of claim 1 wherein
    the reply message further comprises at least one designation for an Internet service provider that the user equipment may access via the wireless network.

7. The method of claim 1 wherein
    the reply message further comprises registration web page information.

8. The method of claim 1 wherein
    the reply message further comprises at least one registration software program for execution by the user equipment.

9. The method of claim 1, wherein the radio access network comprises a Serving GPRS Support Node (SGSN), a tunneling protocol access concentrator, a Radio Network Controller (RNC), and a RADIUS client.

10. A method for a user equipment (UE) for registering with a registration server of a wireless network comprising a Universal Mobile Telecommunications System (UMTS) access network, comprising:
    the UE transmitting a temporary ID and a temporary password identifying the UE as unregistered, for authentication by an authentication server;
    receiving, at the UE, via an anonymous communication session between the UE and the registration server via the UMTS access network, a reply message comprising a request for registration information, the requested registration information comprising a permanent ID and a permanent password, wherein the anonymous communication session is established using a tunneling communications protocol with the UMTS access network;
    transmitting, from the UE, the requested registration information via the anonymous communication session with the registration server; and
    completing registration for subsequent access to the Internet through the Universal Mobile Telecommunications System (UMTS) access network using the permanent ID and permanent password.

11. The method of claim 10 wherein
    the requested registration information further comprises indicia of a preferred service provider.

12. The method of claim 10 wherein
    the requested registration information further comprises indicia of a requested type of service.

13. The method of claim 10 wherein
    the requested registration information further comprises a preferred user name.

14. The method of claim 10 wherein
    the reply message further comprises at least one protocol filter to restrict an access to the wireless network by the user equipment.

15. The method of claim 10 wherein
    the reply message further comprises at least one Internet service provider designation to which the user equipment has access via the wireless network.

16. The method of claim 10 wherein
    the reply message further comprises registration web page information.

17. The method of claim 10 wherein
    the reply message further comprises at least one registration software program for execution by the user equipment.

18. A non-transitory computer-readable medium comprising instructions operable for a registration server of a wireless network comprising a Universal Mobile Telecommunications System (UMTS) access network, the instructions for:
    establishing an anonymous communication session between a user equipment UE and the registration server via the UMTS access network, in response to authentication by an authentication server of a temporary ID and a temporary password identifying the UE as unregistered, wherein the anonymous communication session uses a tunneling communications protocol;
    transmitting to the UE, via the anonymous communication session with the UE, a reply message comprising a request for registration information;
    receiving, from the UE, in response to the request for registration information, a permanent ID and a permanent password; and
    completing registration for the user equipment (UE) for subsequent access to the Internet through the Universal Mobile Telecommunications System (UMTS) access network using the permanent ID and permanent password.

19. A non-transitory computer-readable medium comprising instructions for a user equipment (UE) to register with a registration server of a wireless network comprising a Universal Mobile Telecommunications System (UMTS) access network, the instructions for:
the UE transmitting a temporary ID and a temporary password identifying the UE as unregistered for authentication by an authentication server;
receiving, at the UE, via an anonymous communication session between the UE and the registration server via the UMTS access network, a reply message comprising a request for registration information, the requested registration information comprising a permanent ID and a permanent password, wherein the anonymous communication session is established using a tunneling communications protocol with the radio access network and the core network;
transmitting, from the (UE), the requested registration information via the anonymous communication session with the registration server; and
completing registration for subsequent access to the Internet through the Universal Mobile Telecommunications System (UMTS) access network using the permanent ID and permanent password.

20. A non-transitory computer readable medium comprising instructions operable for an Integrated Network Controller (INC) for registering a User Equipment (UE) with a registration server of a wireless network comprising a Universal Mobile Telecommunications System (UMTS) access network, the instructions for:
transmitting a temporary ID and a temporary password from the UE to the registration server;
obtaining authentication, from an authentication server, of the temporary ID and the temporary password for identifying the UE as unregistered;
establishing an anonymous communication session, using a tunneling communications protocol, between the UE and the registration server in response to the authentication from the authentication server;
relaying to the UE, via the anonymous communication session, a reply message comprising a request for registration information from the registration server;
relaying to the registration server, a permanent ID and a permanent password from the UE in response to the request for registration information; and
completing registration for the user equipment (UE) for subsequent access to the Internet through the Universal Mobile Telecommunications System (UMTS) access network using the permanent ID and permanent password.

21. The computer readable medium of claim 20, wherein the INC comprises a Serving GPRS Support Node (SGSN), a tunneling protocol access concentrator, a Radio Network Controller (RNC), and a RADIUS client.

22. The computer readable medium of claim 20, wherein the anonymous communication session is a Layer 2 protocol link.

23. A user equipment (UE) configured and arranged to register with a registration server of a wireless network comprising a Universal Mobile Telecommunications System (UMTS) access network, the user equipment (UE) configured and arranged to:
transmit a temporary ID and a temporary password identifying the UE as unregistered, for authentication by an authentication server;
receive, at the UE, via an anonymous communication session between the UE and the registration server via the UMTS access network, a reply message comprising a request for registration information, the requested registration information comprising a permanent ID and a permanent password, wherein the anonymous communication session is established using a tunneling communications protocol with the UMTS access network;
transmit, from the UE, the requested registration information via the anonymous communication session with the registration server; and
completing registration for subsequent access to the Internet through the Universal Mobile Telecommunications System (UMTS) access network using the permanent ID and permanent password.

* * * * *

UNITED STATES PATENT AND TRADEMARK OFFICE
CERTIFICATE OF CORRECTION

| | |
|---|---|
| PATENT NO. | : 8,117,291 B1 |
| APPLICATION NO. | : 09/626699 |
| DATED | : February 14, 2012 |
| INVENTOR(S) | : William John Jones et al. |

It is certified that error appears in the above-identified patent and that said Letters Patent is hereby corrected as shown below:

IN THE CLAIMS:

Column 5, Claim 1, Line 18: Change "UE" to -- (UE) --;

Column 6, Claim 18, Line 54: Change "UE" to -- (UE) --.

Signed and Sealed this
Twenty-ninth Day of May, 2012

David J. Kappos
*Director of the United States Patent and Trademark Office*